US012568190B2

(12) United States Patent
Reddy et al.

(10) Patent No.: US 12,568,190 B2
(45) Date of Patent: Mar. 3, 2026

(54) TRUSTED CONFERENCE SYSTEM WITH USER CONTEXT DETECTION

(71) Applicant: DELL PRODUCTS L.P., Round Rock, TX (US)

(72) Inventors: Karunakar Palicherla Reddy, Austin, TX (US); Douglas Jarrett Peeler, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 18/536,365

(22) Filed: Dec. 12, 2023

(65) Prior Publication Data

US 2025/0193341 A1 Jun. 12, 2025

(51) Int. Cl.
*H04N 7/15* (2006.01)
*G06T 7/70* (2017.01)

(52) U.S. Cl.
CPC .............. *H04N 7/152* (2013.01); *G06T 7/70* (2017.01)

(58) Field of Classification Search
CPC ...... G06F 3/04842; G06F 21/31; G06F 21/34; G06Q 10/101; G06T 7/70; H04L 12/1818; H04L 12/1822; H04L 63/104; H04L 65/4038; H04L 12/1895; H04L 67/10; H04M 3/563; H04M 3/56; H04M 3/567; H04N 7/147; H04N 7/15; H04N 7/152; H04N 7/142; H04N 7/155; H04N 21/4788; H04N 23/698; G06V 40/161; G06V 40/28; H04W 4/16
See application file for complete search history.

(56) References Cited

U.S. PATENT DOCUMENTS

| | | | |
|---|---|---|---|
| 7,751,347 B2 | 7/2010 | Giroti | |
| 8,175,243 B2 * | 5/2012 | Mahalingam | H04M 3/56 |
| | | | 379/202.01 |
| 8,539,359 B2 | 9/2013 | Rapaport et al. | |
| 8,786,669 B1 * | 7/2014 | Hwang | H04L 67/10 |
| | | | 348/14.09 |
| 8,819,726 B2 | 8/2014 | Wetzer et al. | |
| 9,330,145 B2 | 5/2016 | Satyanarayanan | |
| 9,554,091 B1 * | 1/2017 | Malegaonkar | H04N 7/152 |
| 9,819,902 B2 | 11/2017 | Rintel et al. | |
| 10,218,520 B2 | 2/2019 | Atarius et al. | |
| 10,805,332 B2 | 10/2020 | Gunda et al. | |
| 11,032,246 B2 | 6/2021 | Gunda et al. | |
| 11,397,609 B2 | 7/2022 | Krishnamurthy et al. | |

(Continued)

*Primary Examiner* — Gerald Gauthier
(74) *Attorney, Agent, or Firm* — Jackson Walker L.L.P.

(57) ABSTRACT

Techniques for enabling a trusted conference session with user context detection includes determining a participant roster for a conference session; identifying a plurality of users participating in the conference based on signals from sensors of the computer system; determining that the identified users match the plurality of users included in the participant roster; in response, continuing the conference session as a trusted conference session; determining a relative position of an identified user based on the signals from the sensors; adjusting the camera of the computer system based on the determined position of the identified user; determining a voice profile for the identified user based on the signals from the sensors; and adjusting the audio input device of the computer system based on the determined voice profile of the identified user.

20 Claims, 3 Drawing Sheets

(56)          References Cited

U.S. PATENT DOCUMENTS

2002/0103864 A1*  8/2002  Rodman ............... H04M 3/567
                                                      348/E7.083
2003/0058806 A1*  3/2003  Meyerson .............. H04W 4/16
                                                      370/260
2005/0015444 A1*  1/2005  Rambo .............. G06F 3/04842
                                                      348/E7.083
2007/0200919 A1*  8/2007  D'Amora .............. H04N 7/152
                                                      348/E7.084
2007/0260684 A1*  11/2007 Sharma ............. H04L 12/1818
                                                      709/204
2009/0040288 A1*  2/2009  Larson .................. H04N 7/142
                                                      348/E7.078
2009/0213207 A1*  8/2009  Shah ...................... H04N 7/147
                                                      348/14.09
2013/0014266 A1*  1/2013  Yeung .................. H04L 63/104
                                                      726/26
2013/0242036 A1*  9/2013  Gorzynski .......... H04N 23/698
                                                      348/14.09

2013/0314491 A1*  11/2013 Vivekanandan .... H04L 65/4038
                                                      348/14.08
2015/0271220 A1*  9/2015  Kleiner ................ G06Q 10/101
                                                      709/204
2017/0293763 A1*  10/2017 Shear ...................... G06F 21/31
2019/0019162 A1*  1/2019  Yang ...................... H04N 7/155
2019/0213498 A1   7/2019  Adjaoute
2020/0084057 A1*  3/2020  Wadhwa .............. H04M 3/563
2021/0211317 A1*  7/2021  Khan ..................... H04N 7/155
2022/0200816 A1*  6/2022  Ji ........................ H04L 12/1895
2022/0261273 A1   8/2022  Gunda et al.
2023/0101606 A1*  3/2023  Wu .................... H04N 21/4788
                                                      348/14.09
2023/0109787 A1*  4/2023  O'Leary ................ G06V 40/28
                                                      348/14.09
2023/0164273 A1*  5/2023  Channapragada .. H04L 12/1822
                                                      379/202.01
2024/0154831 A1*  5/2024  Carluccio ........... H04L 12/1822
2025/0030682 A1*  1/2025  Adcock .................. G06F 21/34
2025/0030815 A1*  1/2025  Adcock .................. H04N 7/152
2025/0193341 A1*  6/2025  Reddy ...................... G06T 7/70

* cited by examiner

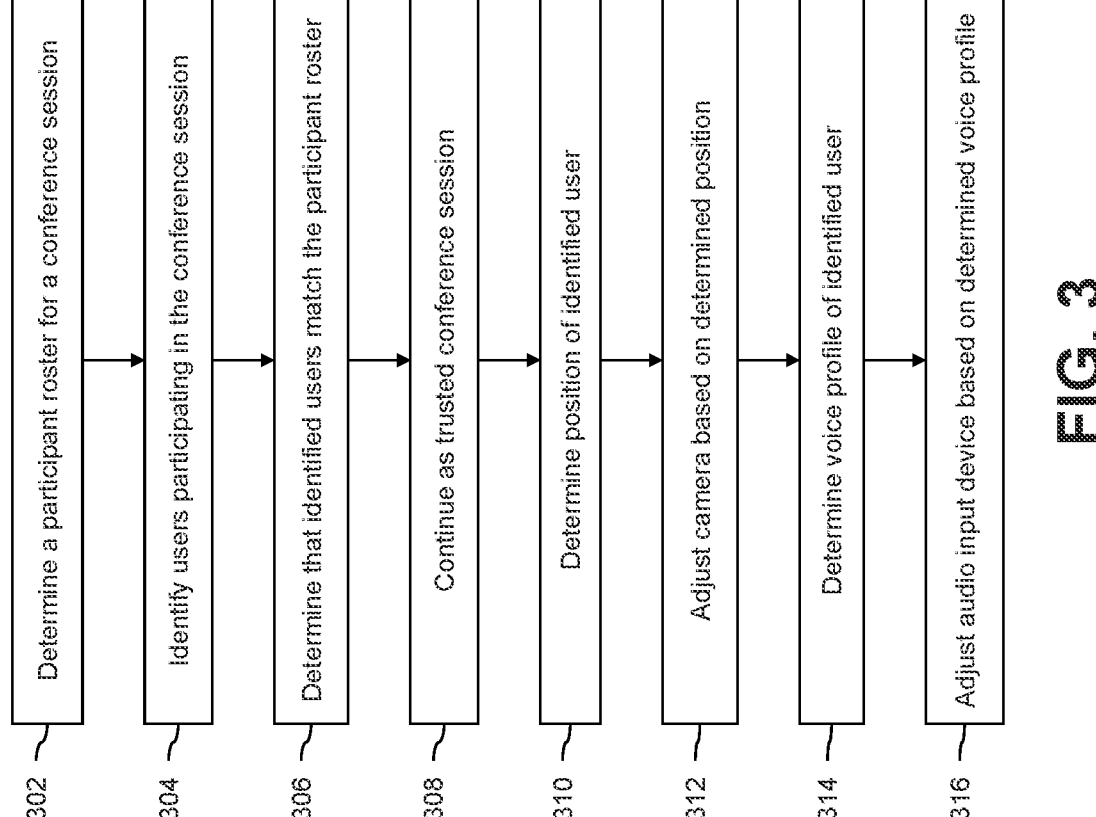

Determine a participant roster for a conference session    302

Identify users participating in the conference session    304

Determine that identified users match the participant roster    306

Continue as trusted conference session    308

Determine position of identified user    310

Adjust camera based on determined position    312

Determine voice profile of identified user    314

Adjust audio input device based on determined voice profile    316

TRUSTED CONFERENCE SYSTEM WITH USER CONTEXT DETECTION

TECHNICAL FIELD

The present disclosure relates in general to information handling systems, and more particularly to techniques for detecting and adapting to user context in a trusted conference session in information handling systems.

BACKGROUND OF THE INVENTION

Many computer systems can detect the physical presence of a user near the system. This ability to detect user presence can allow the system to be contextually aware of user's proximity to the system, the user's attention to the system, the environment in which the user is using the system, and other information. For example, a system can automatically wake up from a low power state in response to detecting the presence of a user, and can initiate facial recognition to verify the user's identity to quickly log them into the system. A system can also lock itself when it detects that no user is present. User presence can be detected, for example, by analyzing captured video signals from a low power camera device, audio signals from a microphone, or other signals or combinations of signals.

SUMMARY OF THE INVENTION

In accordance with embodiments of the present disclosure, a method for enabling a trusted conference session with user context detection is described. A participant roster is determined for a conference session, the participant roster including a plurality of users authorized to participate in the conference session. A plurality of users participating in the conference session are identified based on signals from sensors of a computer system. A determination is made that the identified users match the plurality of users included in the participant roster. In response to determining that the identified users match the plurality of users included in the participant roster, the conference session is continued as a trusted conference session. A relative position of an identified user to the computer system is determined based on the signals from the sensors. The camera of the computer system is adjusted based on the determined position of the identified user. A voice profile is determined for the identified user based on the signals from the sensors. The audio input device of the computer system is adjusted based on the determined voice profile of the identified user.

In some cases, adjusting the audio input device includes configuring the audio input device to emphasize the identified user's voice.

In some implementations, adjusting the audio input device includes configuring the audio input device to de-emphasize background noise based on a noise profile determined based on the signals from the sensors.

In some cases, adjusting the camera of the computer system includes adjusting the focal length of the camera to match a distance of the user from the camera, and adjusting the position of the camera to center the user in the camera's field of view.

In some cases, the sensors include one or more of an ultrasound sensor, a WiFi Doppler sensor, an ultra-wideband (UWB) sensor, or a radio frequency (RF) radar sensor.

In some implementations, the method includes identifying an additional user participating in the conference based on signals from the sensors, wherein the additional user is not included in the plurality of users included in the participant roster. In response to identifying the additional user, a determination is made that the conference session is not trusted.

In some cases, the method includes suspending the conference session until the users participating in the conference session match the plurality of users included in the participant roster.

In some cases, the method includes determining that a user context of the identified user is unsuitable for the conference session, and, in response, suspending the identified user from the conference session. In some implementations, suspending the identified user includes pausing a video signal associated with the conference session, and muting an audio signal with the conference session.

In accordance with embodiments of the present disclosure, a system for enabling a trusted conference session with user context detection includes a computer system including at least one processor, a memory, and one or more sensors including a camera and an audio input device. The computer system is configured to perform operations including determining a participant roster for a conference session, the participant roster including a plurality of users authorized to participate in the conference session; identifying a plurality of users participating in the conference based on signals from the sensors; determining that the identified users match the plurality of users included in the participant roster; in response to determining that the identified users match the plurality of users included in the participant roster, continuing the conference session as a trusted conference session; determining a relative position of an identified user to the computer system based on the signals from the sensors; adjusting the camera of the computer system based on the determined position of the identified user; determining a voice profile for the identified user based on the signals from the sensors; and adjusting the audio input device of the computer system based on the determined voice profile of the identified user.

In accordance with embodiments of the present disclosure, an article of manufacture includes a non-transitory, computer-readable medium having computer-executable instructions thereon that are executable by a processor of a computer system to perform operations for enabling a trusted conference session with user context detection. The operations include determining a participant roster for a conference session, the participant roster including a plurality of users authorized to participate in the conference session; identifying a plurality of users participating in the conference based on signals from the sensors; determining that the identified users match the plurality of users included in the participant roster; in response to determining that the identified users match the plurality of users included in the participant roster, continuing the conference session as a trusted conference session; determining a relative position of an identified user to the computer system based on the signals from the sensors; adjusting the camera of the computer system based on the determined position of the identified user; determining a voice profile for the identified user based on the signals from the sensors; and adjusting the audio input device of the computer system based on the determined voice profile of the identified user.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE SEVERAL VIEWS OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a block diagram of an example method for enabling a trusted conference session with user context detection, in accordance with embodiments of the present disclosure;

DETAILED DESCRIPTION OF THE INVENTION

Figure 1:
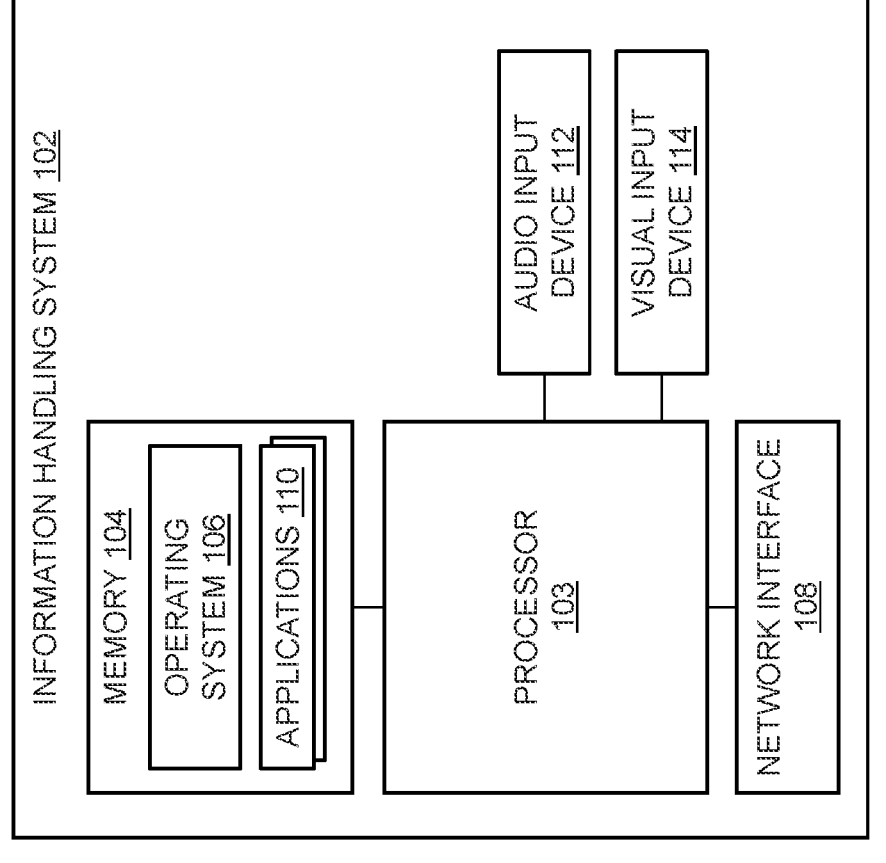
FIG. 1 illustrates a block diagram of an example information handling system, in accordance with embodiments of the present disclosure.

Distractions are common during conference sessions. If one user in a conference session is in a noisy environment, it can disrupt the conference session for all participants. In order to maintain the conference session as a productive working environment, each participant must be attentive to the conference session, and must tune out realtime distractions in their environment or the environments of the other participants. Each participant may need to also be prepared to proactively muting the video and audio feeds during the conference session in response to noise in their environment or other distractions. In addition, many conference sessions involve multiple participants at the same location using a shared computer or dedicated conferencing resource. In such a case, the audio feed of the conference session may include multiple voices (i.e., one for each participant), which may be confusing to the other participants in the conference session. In addition, participants in a conference session run the risk that onlookers or eavesdroppers who are not authorized to participate in the conference may see or hear information for which they are not authorized.

Accordingly, the present disclosure describes techniques for verifying, via user presence detection, that a list of identified users participating in the conference session includes only the user included in the conference roster. Such a session, in which the list of identified users matches the conference roster, is referred to as a trusted conference session. However, if the list of identified users does not match the conference roster, the conference session is an untrusted session, and corrective action is taken, such as for example, suspending the conference session for the computer system associated with the one or more identified users that either are not included in the conference roster, or were unable to be positively identified using user presence detection techniques.

In addition, the techniques described herein may enable the computer system to adjust the captured video and audio feeds associated with a registered user, in order, for example, focus a camera of the computer system on a registered user's face based on the a location of the user as determined from signals captured by sensors associated with the computer system (e.g., visual and audio input devices, an ultrasound sensors, WiFi Doppler sensors, ultra-wideband (UWB) sensors, radio frequency (RF) radar sensor, or any other suitable sensor or combination thereof). Similarly, the audio input device may be adjusted to emphasize speech signals associated with detected user, and to de-emphasize or filter background noise present in the user's environment. The audio input device may also be adjusted to emphasize speech signals associated with detected user when the user is determined to be the current speaker on the conference session, and to de-emphasize the speech signals of other users who are not the current speaker.

Preferred embodiments and their advantages are best understood by reference to FIGS. 1 through 5, wherein like numbers are used to indicate like and corresponding parts.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, and a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Memory 104 may also have stored thereon one or more applications 110. Each of the applications 110 may comprise any program of executable instructions (or aggregation of programs of executable instructions) configured to make use of the hardware resources of the information handling system 102, such as memory, processor time, disk space, input and output devices (e.g., 112, 114), and the like. In some implementations, the applications 110 may interact with the operating system 106 to make of the hardware resources, and the operating system 106 may manage and control the access of the applications 110 to these resources (as described above).

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In some embodiments, information handling system 102 may include more than one processor 103. For example, one such processor 103 may be a CPU, and other processors 103 may include various other processing cores such as application processing units (APUs) and graphics processing units (GPUs).

Information handling system 102 further includes an audio input device 112 communicatively coupled to processor 103. Audio input device 112 can be any device (e.g., a microphone) operable to detect audible signals (i.e., sound waves) in the environment external to the information handling system 102, and convert those audible signals into electrical signals. These electrical signals representing the detected audible signals can be provided to the processor 103 where they can be analyzed and interpreted, for example at the direction of applications 110 and/or operating system 106. In some cases, the audio input device 112 can be integrated into the information handling system 102, such as in the case of a built-in microphone. The audio input device 112 may also be an external device communicatively coupled to the information handling system 102, such as an external microphone connected via Universal Serial Bus (USB).

Information handling system 102 further includes an visual input device 114 communicatively coupled to processor 103. Visual input device 114 can be any device operable to detect electromagnetic radiation, such as visible light, and convert it into representative electrical signals. These electrical signals representing the detected electromagnetic radiation can be provided to the processor 103 where they can be analyzed and interpreted, for example at the direction of applications 110 and/or operating system 106. In some cases, the visual input device 114 can be complementary metal-oxide-semiconductor (CMOS) sensor, a charge coupled device (CCD) sensor, or another type of sensor operable to detect electromagnetic radiation. In some implementations, the visual input device 114 may be configured to detect a particular range of wavelengths of electromagnetic radiation, such as the visual light range, the ultraviolet range, the infrared range, or combinations of these and other ranges. In some cases, the visual input device 114 may be a low power camera device that monitors the environment while the information handling system 102 remains in a lower power state. In some implementations, the visual input device 114 can be integrated into the information handling system 102, such as in the case of a built-in camera. The visual input device 114 may also be an external device communicatively coupled to the information handling system 102, such as an external camera connected via USB.

In some implementations, the information handling system 102 may include additional input devices in addition to or in place of the audio input device 112 and the video input device 114, including, but not limited to, an ultrasound sensor, a WiFi Doppler sensor, an ultra-wideband (UWB) sensor, a radio frequency (RF) radar sensor, or any other suitable sensor or combination thereof.

Figure 2:
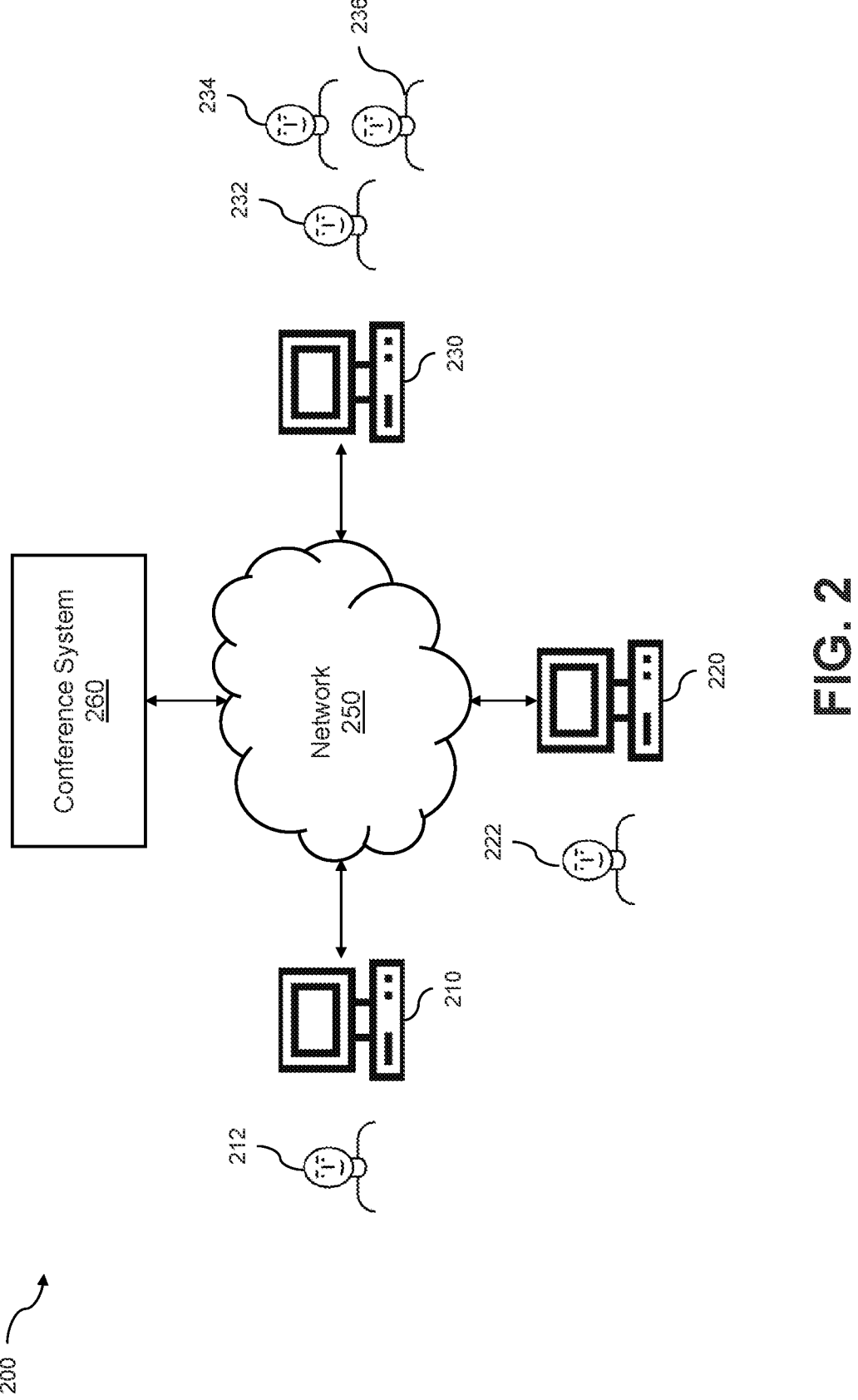
FIG. 2 illustrates a block diagram of an example system for enabling a trusted conference session with user context detection, in accordance with embodiments of the present disclosure.

FIG. 2 illustrates a block diagram of an example system 200 for enabling a trusted conference session with user context detection, in accordance with embodiments of the present disclosure. As shown, system 200 includes computer system 210 associated with a user 212, computer system 220 associated with a user 222, and computer system 230 associated with users 232, 234, and 236. The computer systems 210, 220, and 230, and a conference system 260 are communicatively coupled via a network 250. In some cases, the network 250 may be a public network such as the Internet, and the conference system 260 may be commercially available conference system such as ZOOM, MICROSOFT TEAMS, or another such system.

As described above, the techniques described herein may enable a trusted conference session in which every user participating in the conference is included on a conference roster and is thus authorized to participate, and in which no additional users that are not authorized to participate are participating or eavesdropping on the conference session. For example, assume computer systems 210, 220, and 230 are connected via the network 250 to a conference session hosted by the conference system 260, and the conference roster included users 212, 222, 232, 234, and 236. Assuming each of these users are detected by the computer systems 210, 220, and 230, and no other users are detected, the conference session may be deemed a trusted conference session, meaning that information shared between the users 212, 222, 232, 234, and 236 during the conference session will not be received by other unauthorized users.

However, supposed the conference roster includes users 212, 222, 232, and 234, but not user 236. In such a case, the computer system 230 would detect the presence of user 236 and modify the conference session to an untrusted state. In some implementations, the transition of a conference session to the untrusted state may trigger one more actions, such as, for example, notifying a registered user of the computer 230 (e.g., users 232, 234) or an administrator that the unauthorized user 236 is attempting to view and/or listen to the conference session, pausing or suspending a video feed associated with the conference session at computer 230, muting an audio feed associated with the conference session at computer 230, or other actions or combinations of actions.

FIG. 3 illustrates a block diagram of an example method 300 for enabling a trusted conference session with user context detection, in accordance with embodiments of the present disclosure. In some implementations, the method 300 may be performed by a computer system, such as information handling system 102.

At 302, a participant roster is determined for a conference session, the participant roster including a plurality of users authorized to participate in the conference session.

At 304, a plurality of users participating in the conference session are identified based on signals from sensors of a computer system. In some cases, the sensors include one or more of an ultrasound sensor, a WiFi Doppler sensor, an ultra-wideband (UWB) sensor, or a radio frequency (RF) radar sensor. At 306, a determination is made that the identified users match the plurality of users included in the participant roster. At 308, in response to determining that the identified users match the plurality of users included in the participant roster, the conference session is continued as a trusted conference session.

At 310, a relative position of an identified user to the computer system is determined based on the signals from the sensors. At 312, the camera of the computer system is adjusted based on the determined position of the identified user. In some cases, adjusting the camera of the computer system includes adjusting the focal length of the camera to match a distance of the user from the camera, and adjusting the position of the camera to center the user in the camera's field of view.

At 314, a voice profile is determined for the identified user based on the signals from the sensors. At 316, the audio input device of the computer system is adjusted based on the determined voice profile of the identified user. In some cases, adjusting the audio input device includes configuring the audio input device to emphasize the identified user's voice. Such adjustments may include, but are not limited to, beam forming, gain adjustment, or other adjustments or combinations of adjustments to the audio input device. In some implementations, adjusting the audio input device includes configuring the audio input device to de-emphasize background noise based on a noise profile determined based on the signals from the sensors. Such adjustments may include, but are not limited to, gain adjustment, filtering specific frequency bands, active noise cancelling, or other adjustments or combinations of adjustments to the audio input device.

In some implementations, the method 300 includes identifying an additional user participating in the conference based on signals from the sensors, wherein the additional user is not included in the plurality of users included in the participant roster. In response to identifying the additional user, a determination is made that the conference session is not trusted.

In some cases, the method 300 includes suspending the conference session until the users participating in the conference session match the plurality of users included in the participant roster.

In some cases, the method 300 includes determining that a user context of the identified user is unsuitable for the conference session, and, in response, suspending the identified user from the conference session. In some implementations, suspending the identified user includes pausing a video signal associated with the conference session, and muting an audio signal with the conference session.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RA), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method comprising:

determining, by a computer system including at least one processor, a memory, and one or more sensors including a camera and an audio input device, a participant roster for a conference session, the participant roster including a plurality of users authorized to participate in the conference session;

identifying, by the computer system, a plurality of users participating in the conference based on signals from the sensors;

determining, by the computer system, that the identified users match the plurality of users included in the participant roster;

in response to determining that the identified users match the plurality of users included in the participant roster, continuing the conference session as a trusted conference session;

identifying, by the computer system, an additional user participating in the conference based on signals from the sensors, wherein the additional user is not included in the plurality of users included in the participant roster; and in response to identifying the additional user, determining that the conference session is not trusted.

2. The method of claim 1, further comprising:

suspending, by the computer system, the conference session until the users participating in the conference session match the plurality of users included in the participant roster.

3. The method of claim 1, wherein the sensors include one or more of an ultrasound sensor, a WiFi Doppler sensor, an ultra-wideband (UWB) sensor, or a radio frequency (RF) radar sensor.

4. The method of claim 1, further comprising:

determining, by the computer system, a relative position of an identified user to the computer system based on the signals from the sensors;

adjusting, by the computer system, the camera of the computer system based on the determined position of the identified user; and determining, by the computer system, a voice profile for the identified user based on the signals from the sensors.

5. The method of claim 4, wherein adjusting the camera of the computer system includes adjusting the focal length of the camera to match a distance of the user from the camera, and adjusting the position of the camera to center the user in the camera's field of view.

6. The method of claim 4, wherein adjusting the audio input device includes configuring the audio input device to emphasize the identified user's voice.

7. The method of claim 4, wherein adjusting the audio input device includes configuring the audio input device to de-emphasize background noise based on a noise profile determined based on the signals from the sensors.

8. The method of claim 4, further comprising:

determining, by the computer system, that a user context of the identified user is unsuitable for the conference session; and in response, suspending, by the computer system, the identified user from the conference session.

9. The method of claim 8, wherein suspending the identified user includes pausing a video signal associated with the conference session, and muting an audio signal with the conference session.

10. A system comprising:

a computer system including at least one processor, a memory, and one or more sensors including a camera and an audio input device, and configured to perform operations including:

determining a participant roster for a conference session, the participant roster including a plurality of users authorized to participate in the conference session;

identifying a plurality of users participating in the conference based on signals from the sensors;

determining that the identified users match the plurality of users included in the participant roster;

in response to determining that the identified users match the plurality of users included in the participant roster, continuing the conference session as a trusted conference session;

identifying an additional user participating in the conference based on signals from the sensors, wherein the additional user is not included in the plurality of users included in the participant roster; and in response to identifying the additional user, determining that the conference session is not trusted.

11. The system of claim 10, further comprising:

suspending the conference session until the users participating in the conference session match the plurality of users included in the participant roster.

12. The system of claim 10, the operations further comprising:

determining a relative position of an identified user to the computer system based on the signals from the sensors;

adjusting the camera of the computer system based on the determined position of the identified user;

determining a voice profile for the identified user based on the signals from the sensors; and adjusting the audio input device of the computer system based on the determined voice profile of the identified user.

13. The system of claim 12, wherein adjusting the camera of the computer system includes adjusting the focal length of the camera to match a distance of the user from the camera, and adjusting the position of the camera to center the user in the camera's field of view.

14. The system of claim 12, wherein adjusting the audio input device includes configuring the audio input device to emphasize the identified user's voice.

15. The system of claim 12, wherein adjusting the audio input device includes configuring the audio input device to de-emphasize background noise based on a noise profile determined based on the signals from the sensors.

16. The system of claim 12, the operations further comprising:

determining that a user context of the identified user is unsuitable for the conference session; and in response, suspending the identified user from the conference session.

17. The system of claim 16, wherein suspending the identified user includes pausing a video signal associated with the conference session, and muting an audio signal with the conference session.

18. An article of manufacture comprising a non-transitory, computer-readable medium having computer-executable instructions thereon that are executable by a processor of a computer system including one or more sensors including a camera and an audio input device to perform operations the operations comprising:

determining a participant roster for a conference session, the participant roster including a plurality of users authorized to participate in the conference session;

identifying a plurality of users participating in the conference based on signals from the sensors;

determining that the identified users match the plurality of users included in the participant roster;

in response to determining that the identified users match the plurality of users included in the participant roster, continuing the conference session as a trusted conference session;

identifying an additional user participating in the conference based on signals from the sensors, wherein the additional user is not included in the plurality of users included in the participant roster; and in response to identifying the additional user, determining that the conference session is not trusted.

19. The article of manufacture of claim 18, further comprising:

suspending the conference session until the users participating in the conference session match the plurality of users included in the participant roster.

20. The article of manufacture of claim 18, the operations further comprising:

determining a relative position of an identified user to the computer system based on the signals from the sensors;

adjusting the camera of the computer system based on the determined position of the identified user;

determining a voice profile for the identified user based on the signals from the sensors; and adjusting the audio input device of the computer system based on the determined voice profile of the identified user.

* * * * *